H. B. SPERRY.
TANDEM DRAFT CONNECTION.
APPLICATION FILED AUG. 29, 1913.
1,161,991.
Patented Nov. 30, 1915.
2 SHEETS—SHEET 1.
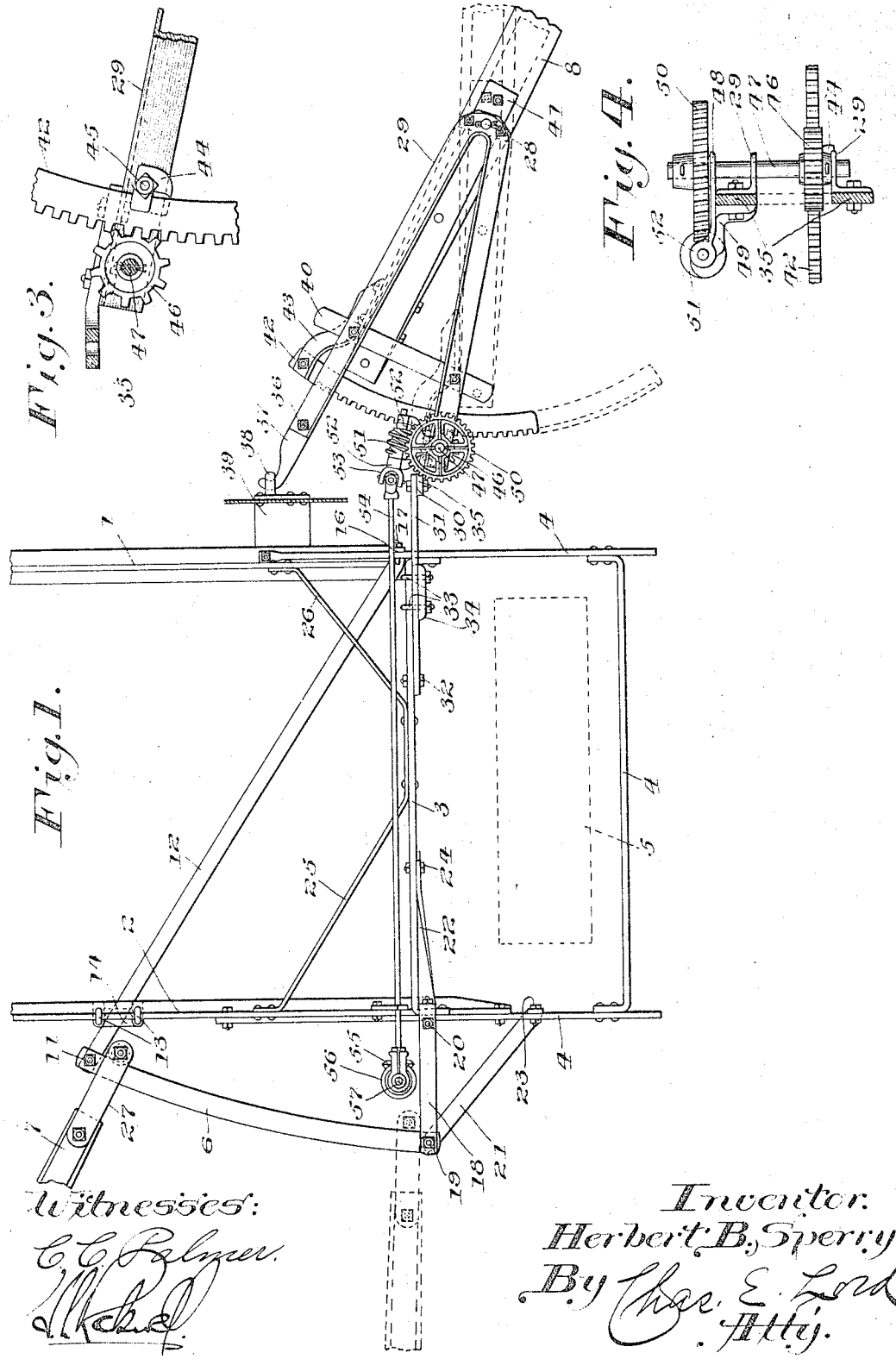
Witnesses:
Inventor:
Herbert B. Sperry,
By Chas. E. Lord
Atty.

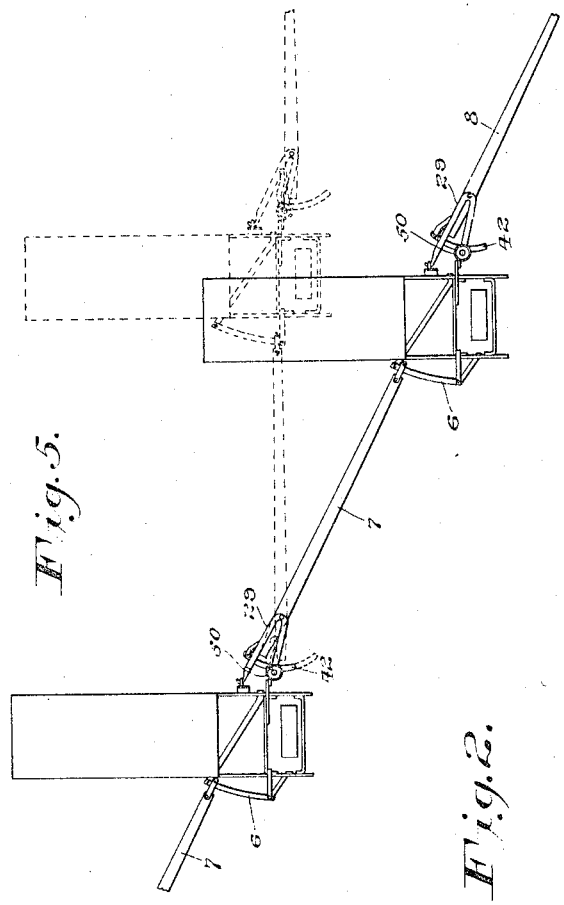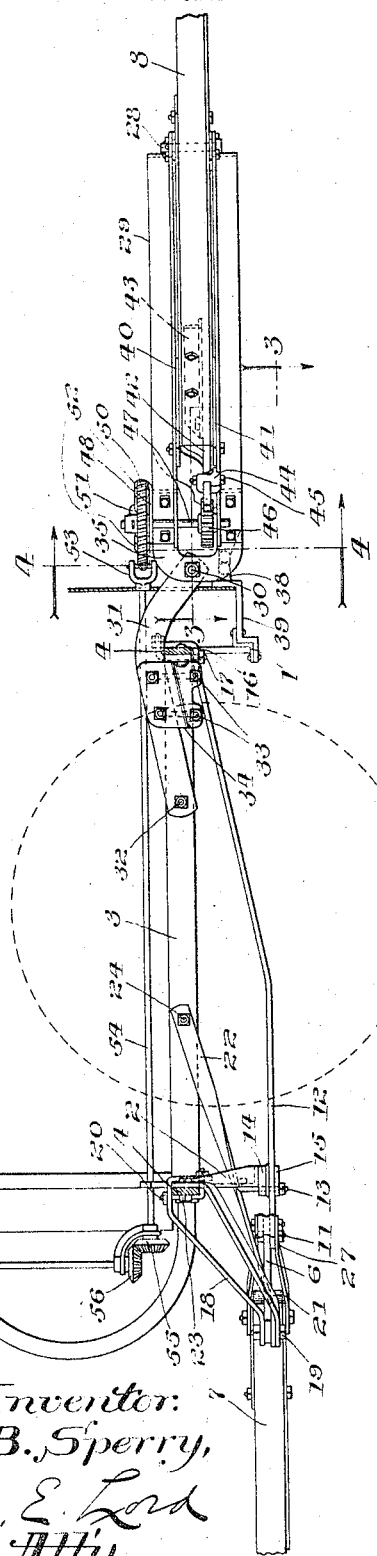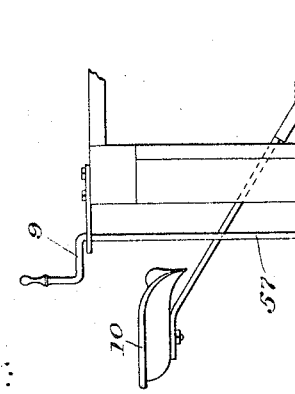

UNITED STATES PATENT OFFICE.

HERBERT B. SPERRY, OF AUBURN, NEW YORK, ASSIGNOR TO INTERNATIONAL HARVESTER COMPANY OF NEW JERSEY, A CORPORATION OF NEW JERSEY.

TANDEM DRAFT CONNECTION.

1,161,991.     Specification of Letters Patent.     Patented Nov. 30, 1915.

Application filed August 29, 1913. Serial No. 787,334.

*To all whom it may concern:*

Be it known that I, HERBERT B. SPERRY, a citizen of the United States, residing at Auburn, in the county of Cayuga and State of New York, have invented certain new and useful Improvements in Tandem Draft Connections, of which the following is a full, clear, and exact specification.

My invention relates to tandem draft connections.

It has for its object to improve and simplify the construction of tandem draft connections of the type adapted for use in connection with harvesters and the like, wherein several devices are trailed one in the rear of the other, either in alinement during transport, or in offset relation during the operation of the same; the several machines being adapted to be attached in series relation at the rear of any suitable power device, such, for example, as a tractor.

More specific objects of my invention are to strengthen the frame of a machine in such a manner as to resist any warping action due to the connection of machines at the rear thereof, and to improve the draft tongue connections of the machine whereby relative movement between the tongue and the machine frame and independent angular adjustment of the tongue relatively to the line of draft, is obtained.

I attain these objects by the provision of improved draft connections carried upon the machine frame and improved draft tongue mechanism operatively connected to the frame and coöperating with the draft connections thereon in an improved manner, the draft connections on each machine being specifically improved and adapted to coöperate when used in series relation.

In the accompanying drawings I have illustrated one embodiment which my invention may assume in practice. It is to be understood, however, that the form shown herein for purposes of illustration may be modified without departing from the spirit of my invention.

Figure 1 is a top plan view of a binder frame equipped with this form of my improvement. Fig. 2 is a side elevation of the construction shown in Fig. 1, the binder seat and its support being shown. Fig. 3 is a sectional view on line 3—3 of Fig. 2. Fig. 4 is a sectional view on line 4—4 of Fig. 2. Fig. 5 is a diagrammatic view showing a plurality of machines in tandem relation, both during transport and operation of the several machines.

In the construction shown I have illustrated a binder frame comprising parallel front and rear platform members 1 and 2 formed of angle material disposed transversely to the line of draft and connected at their ends by longitudinally disposed frame members 3; a suitable main wheel frame 4 inclosing the main wheel 5 being rigidly attached to the frame thus formed on the stubbleward side of the stubbleward member 3. At the rear of the frame thus formed, an arcuate draft member 6 is disposed transversely of the line of draft and protruded at the rear of the frame to which it is connected in a manner hereinafter described; this member being adapted to be adjustably connected to a draft tongue 7 of a trailing binder. On the front end of the frame a pivoted draft tongue 8 is provided which is connected to the frame in an improved manner hereinafter described and adjustable angularly with respect thereto and the line of draft by means of a crank 9 carried on the frame at a point adjacent the operator's seat 10.

As shown in Fig. 1, the member 6 is a flat plate of arcuate form and disposed substantially parallel to the ground, the grainward end thereof being rigidly connected by a bolt 11 to an elongated supplemental reinforcing frame member 12 disposed diagonally across the frame to a point at the front end of the same. As shown (Fig. 2), this member 12 is attached to the rear frame member 2 by means of a pair of clamping bolts 13, the hooked ends of the bolts being engaged over the flange on the frame member 2, while the member 12 is clamped thereby to this frame member and between a casting 14 and a plate 15 by the bolts, the construction being such that no drilling of the machine frame is required, and when the nuts on the bolts are released, the latter may be readily disengaged from the frame member 2 to release the member 12. As shown in Fig. 2, this member 12 protrudes substantially horizontally to the ground throughout substantially half its length and is then bent upward at an angle to the horizontal in such a manner as to bring its forward end beneath the frame member 1. This forward end is bent up substantially at right angles as shown at 16, and clamped to the front frame member 1 by means of an L-bolt 17 in such a manner as to securely position the same thereon and at the same time avoid the necessity of drilling the frame. The opposite or stubbleward end of the member 6 is rigidly connected to the frame member 2 by means of a short rearwardly extending downwardly disposed brace 18, the rear end of which is bolted thereto by means of a bolt 19, while the front end of the brace is fixed rigidly to the frame by a suitable L-bolt 20. Additional braces 21 and 22 are also provided for this end of the arcuate member 6, the brace 21 being disposed diagonally thereto and attached to the same by the bolt 19 and to the frame at a point on the stubbleward side of the L-bolt connection 20 by a suitable bolt connection 23, while the bracing member 22 is protruded forwardly beyond the L-bolt connection 20 and in substantially longitudinal relation with respect thereto, to a point within the frame, where it is attached to the member 3 by means of a suitable bolt connection 24; this member 22 being twisted intermediate its ends in such a manner as to give it increased strength and rigidity. Further, in order to increase the strength of the frame, I may provide corner braces 25 and 26 rigidly connecting the members 2 and 1 to the member 3. As shown in Fig. 1 the draft tongue 7 of a trailing harvester is provided with a trolley or clevis connection 27 in such a manner that it may travel freely along the arcuate member 6, occupying the position shown in full lines, when the harvesters are operating in tandem relation, and that shown in dotted lines when the same are trailing during transport.

Coöperating with the mechanism just described, is the improved draft tongue connection connected at the front of the frame. As shown in Fig. 1, the draft tongue 8 thereof is pivoted at 28 to the front end of a tongue or draft frame 29, which is itself pivotally attached at 30 to a rigid goose neck 31 carried by the machine frame. As shown, this goose neck is rigidly attached at its rear end to the longitudinal frame member 3 by a bolt 32 and protrudes forward therefrom over the front frame member 1 substantially in the line of draft, its front end being protruded downward. Further, to give increased rigidity at a point between this bolt connection 32 and the frame member 1, it is also fixed to the frame member 3 by means of clamping U-bolts 33 extending therethrough and around the member 3; these bolts in this construction being tightened on a coöperating clamping casting 34 in such a manner as to form a rigid construction and at the same time one which does not require drilling the machine frame. The draft frame, 29, which is pivotally connected with the goose neck 31 at 30 and to which the draft tongue 8 is pivoted, is shown to be of skeleton construction although it may obviously be of other construction, and to comprise a pair of superimposed substantially V-shaped members having arms of unequal length disposed in spaced parallel relation so that the inner end of the draft member 8 may swing freely between the same in a transverse plane. As shown, these members are formed of angle material, one set of their adjacent ends being rigidly connected by a U-shaped plate 35 pivotally attached at its bowed end to the goose neck 31 in such a manner as to be freely movable in a vertical plane. The opposite ends of these two superimposed members are brought together and rigidly connected at 36 to a hook 37 pivoted at 38 to a forwardly protruding bracket 39 on the harvester frame on the grainward side of the goose neck 31.

As heretofore mentioned, the draft tongue 8 is freely movable between the members 29; suitable wearing plates 40 and 41 being provided on the frame and tongue respectively to prevent wear on the parts by reason of the movement. It also is provided at its rear end with a curved, arc-shaped, transversely disposed rack member or sector 42 which is rigidly connected to the same by a bracket 43 secured to the side of the tongue near its end and projecting rearwardly therefrom; this sector being movable angularly with respect to the line of draft as the tongue 8 is moved about its pivot. To guide this sector or rack member in its movement, a suitable slotted guide 44 is provided on the lower member of the frame 29, this guide being secured to the member 29 by a bolt 45. As the sector 42 moves back and forth in this guide, it meshes with a pinion 46 secured to an upstanding spindle 47. The ends of this spindle are journaled in the horizontal flanges of the frame member 29, while its upper end is also journaled in a lug 48 on a bracket 49 rigidly attached to the upper member of the draft frame 29. Upon the upper end of this spindle 47 is a worm wheel 50 which meshes with a worm 51 journaled in extensions or lugs 52 on the bracket 49. This worm 51 is operatively connected at its rear end through a universal connection 53 with a rearwardly extending shaft 54 journaled in the frame and protruding beyond the rear frame member 2, where it is equipped with a beveled gear 55 meshing with a coöperating beveled gear 56 carried on an upwardly extending shaft 57 preferably formed integral with the handle or crank 9, hereinbefore mentioned, and protruding adjacent the operator's seat 10.

In the operation of the construction shown, it is evident that when the machines are arranged in tandem relation, as shown in Fig. 5, the operator of the rear machine may readily adjust the same either to transport or cutting position by rotation of the crank 9. For instance, let us assume that the machines are in the position shown in full lines, i. e., that they are trailing in offset relation so that the cutting mechanism of the successive trailing machines cuts successive swaths. Should the operator desire to throw them in tandem relation, it is obviously only necessary for him to turn the crank 9 in such a manner as to throw the tongue 8 toward the position shown in dotted lines, the machine swinging in rear of the tongue to the position shown. Further, should the operator desire to vary the width of cut while the machines are in offset relation, this may be readily accomplished by similarly adjusting the draft tongue 8. Obviously, when the tractor is turned, due to the connection of the several machines to each other, these machines will be successively turned through the same angle through which the tractor moves, and will at the same time be under the control of the operator so that he may vary the width of cut in such a manner as to make the cutting mechanism of his machine always overlap the preceding machine and give a clean cut to the field. It is to be noted that in this construction the front draft frame is pivoted to the machine frame in such a manner that the latter is capable of independent movement with respect to the former, or vice versa, in a vertical plane, while, due to the pivoting of the tongue in this draft frame, the frame is freely adjustable angularly relative to the line of draft in a transverse plane. It is also to be noted that by the use of the improved operating mechanism for the tongue a very compact construction is provided in which the operating parts due to the location of the same at a point in the rear of the tongue pivot, are fully protected, and in which only a small movement of the rack is required to produce a comparatively large movement of the front end of the tongue along its arcuate member at the rear of the front harvester. Further, the binder frame is rigidly reinforced in such a manner as to increase the strength of the same materially and to make it fully capable of the additional stress and strain arising from the connection thereto of the trailing machines. Attention is further directed to the fact that due to the pivotal connection of the draft tongue at a point in front of the frame, the strain of the draft tongue is taken upon the draft frame proper rather than upon the machine frame, and that the draft of the front draft frame is so disposed with respect to the main frame and its rear draft connections as to eliminate any danger of warping the machine frame. Obviously also by my improved construction wherein the arms of the draft frames are of unequal length, the frame may be disposed at the angle with respect to the line of draft desirable in tandem draft connections, and at the same time stock may be saved and an ample clearance provided between the draft frame pivot and the harvester frame. It is also to be noted that the mechanism for adjusting the draft tongue is of simple and rugged construction, permitting the tongue to be adjusted with facility, and that the entire draft attachment is so constructed that it is adapted to be readily and quickly attached to any binder of standard construction.

While I have in this application described one form which my invention may assume in practice, it is, of course, to be understood that the embodiment chosen herein for purposes of illustration is susceptible of modification.

What I claim as my invention and desire to secure by Letters Patent is:

1. In a tandem draft connection, a machine frame, a draft frame having rearwardly extending arms pivoted to said machine frame, a tongue pivoted to said draft frame adjacent the front end of said arms, and means carried on one of the arms of said draft frame and engageable with said tongue for swinging the latter about its pivot.

2. In a tandem draft connection, a machine frame, a draft frame having a relatively wide rear end pivoted to said machine frame, a tongue pivoted to the front end of said draft frame, a transverse rack carried on the rear end of said tongue, and coöperating pinion mechanism for actuating said rack carried on the rear end of said draft frame.

3. In a tandem draft connection, a machine frame, a draft frame including a frame member having arms of unequal length pivoted to said machine frame, a draft tongue pivoted to the front end of said frame member, and rack and pinion mechanism carried on said tongue and the short arm of said draft member respectively for swinging said tongue about its pivot.

4. In a tandem draft connection, a machine frame, a plurality of substantially V-shaped draft frame members disposed one above the other, a member connecting the ends of one set of arms of said members and pivoted to said frame, means for connecting the ends of the other set of arms of said members, and a hook rigidly connected to said last mentioned arms and pivotally connected to said frame.

5. In a tandem draft connection, a machine frame, a draft member protruding forwardly therefrom, a member pivotally connected to said draft member, a plurality of superimposed draft frame members, each having one arm rigidly connected to said pivoted member and their opposite arms rigidly connected together, and means connected to said rigidly connected arms for pivoting the latter on said frame at one side of said draft member.

6. In a tandem draft connection, a machine frame, a goose neck carried on the front thereof, a forwardly protruding member pivotally connected to said goose neck, a plurality of superimposed V-shaped members, each having one arm rigidly connected to said forwardly protruding member and their opposite arms rigidly connected together, and a hook rigidly connected to said rigidly connected arms and pivoted on said machine frame at one side of said goose neck.

7. In a tandem draft connection, a draft frame including a plurality of superimposed draft frame members having rearwardly extending arms, a pole pivoted adjacent the front end of said frame, means carried on one set of arms of said frame and engageable with the rear end of said pole for swinging the latter about its pivot, and means for pivoting the rear ends of both of said sets of arms on a machine frame.

8. In a tandem draft connection, a draft attachment including a plurality of superimposed draft frame members rigidly connected together and having arms of unequal length, a pole pivoted at the front end of said members, a rack carried on the end of said pole, pinion mechanism for reciprocating the same carried on one of the short arms of said draft frame, and means for pivotally connecting said arms with a machine frame.

9. In a tandem draft connection, a machine frame, an angular draft frame having rearwardly extending arms pivoted to said machine frame, a tongue pivoted to the front end of said draft frame, a rack carried on the rear end of said tongue, coöperating pinion mechanism therefor carried on one arm of said draft frame, and worm mechanism for operating said pinion mechanism carried on said arm adjacent said pinion mechanism.

10. In a tandem draft connection, a draft attachment including a plurality of superimposed draft frame members rigidly connected together and having rearwardly extending arms, a pole pivoted at the front end of said members, a rack carried on the end of said pole, pinion mechanism for reciprocating said rack, a member rigidly connecting the ends of one set of arms and carrying said pinion mechanism, a rearwardly disposed draft member pivotally connected to said last mentioned member, and means for pivotally connecting the opposite set of arms to a machine frame.

11. In a tandem draft connection, a plurality of superimposed draft frame members rigidly connected together and having rearwardly extending arms, a bracket carried on one of said sets of arms and protruding toward the other, pinion mechanism journaled in said bracket, a worm journaled in said bracket engaging a pinion of said pinion mechanism, a pole pivoted adjacent the front end of said draft frame members and movable between the same, and a rack carried adjacent the rear end of said pole engageable with another pinion of said pinion mechanism.

12. In a tandem draft connection, a machine frame, a draft member protruding forwardly therefrom, a member pivotally connected thereto, a plurality of superimposed draft frame members, each having one arm rigidly connected to said pivoted member and their opposite arms rigidly connected together, a hook rigidly connected to said rigidly connected arms and pivoted on said frame at one side of said draft member, a tongue pivotally connected to and movable between said superimposed members, a rack carried on said tongue, and pinion mechanism engageable with said rack and journaled on the set of said arms connected to said pivoted member.

13. In a tandem draft connection, a machine frame, a draft member protruding forwardly therefrom, a member pivotally connected thereto, a plurality of superimposed draft frame members, each having one arm rigidly connected to said pivoted member and their opposite arms rigidly connected together, a hook rigidly connected to said rigidly connected arms and pivoted on said frame at one side of said draft member, a tongue pivotally connected to and movable between said superimposed members, a rack carried on said tongue, pinion mechanism carried on the set of said arms connected to said pivoted member and engageable with said rack, and longitudinally disposed worm mechanism journaled adjacent said pinion mechanism and movable with said pivoted member extending rearwardly parallel to said draft member.

14. In a tandem draft connection, a machine frame, a draft member thereon, a substantially U-shaped member having its bowed portion pivoted to said draft member and superimposed forwardly extending arms, said member being movable in a vertical direction about its pivot, a pole pivoted at a point intermediate its ends to the front end of said U-shaped member and movable beween the arms of the latter, and means carried on said substantially U-shaped member and operating upon the rear end of said pole for swinging the latter about its pivot.

15. In a tandem draft connection, a machine frame, a draft member protruding longitudinally therefrom, a substantially U-shaped member pivoted to said draft member, a bracket carried on said U-shaped member, a spindle journaled in said bracket, pinions carried on opposite ends of said spindle, a worm shaft disposed substantially at right angles to said spindle likewise carried on said bracket and engaging one of said pinions, a tongue pivotally connected to said U-shaped member and movable between the arms of the same, and a rack on the end of said tongue engageable with the other pinion on said spindle.

16. In a tandem draft connection, a machine frame, a plurality of superimposed V-shaped members having rearwardly extending arms pivoted to said machine frame, a tongue pivoted to the front end of said members at a point intermediate its ends and movable between said V-shaped members, a bearing plate for said tongue rigidly connecting the arms of said members, an arcuate rack rigidly connected to the end of said tongue and guided by said plate, a bracket carried on one set of arms of said members, a spindle journaled therein, a pinion carried on said spindle engaging said rack, and means on said machine frame for rotating said spindle.

17. In a tandem draft connection, a machine frame, a plurality of superimposed V-shaped members having rearwardly extending arms pivoted to said machine frame, a tongue pivoted to the front end of said members and movable between the same, a bearing plate for said tongue rigidly connecting the arms of said members, an arcuate rack rigidly connected to the end of said tongue, a spindle disposed between one set of arms of said members and journaled therein, a pinion carried on said spindle and engaging said rack, means on said machine frame for rotating said spindle and thereby reciprocating said rack, and means on one of said arms for guiding said rack.

18. In a tandem draft connection, a binder frame having front and rear sill members, a diagonally disposed supplemental frame member rigidly connected to said front sill member and extending toward said rear sill member, an arcuate transversely disposed draft member rigidly connected at its grainward end to the rear end of said diagonal member, and means rigidly connecting the stubbleward end of said arcuate member to said frame.

19. In a tandem draft connection, a binder frame having front and rear sill members, a diagonally disposed supplemental frame member rigidly connected to said front sill member and protruded beyond said rear sill member, an arcuate transversely disposed draft member rigidly connected at its grainward end to the protruding end of said diagonal member, and means rigidly connecting the stubbleward end of said arcuate member to said frame.

20. In a tandem draft connection, a binder frame having front and rear sill members, a diagonally disposed supplemental frame member rigidly connected to said front sill member and protruded beyond said rear sill member, an arcuate transversely disposed draft member rigidly connected at its grainward end to the protruding end of said diagonal member, and means rigidly connecting the stubbleward end of said arcuate member to said frame at a point substantially in the rear of the point of connection of said diagonally disposed member to said front sill member.

21. In a tandem draft connection, a binder frame comprising front and rear sill members, a longitudinally extending connecting frame member, a reinforcing frame member rigidly connected to said front sill member and protruding diagonally rearward therefrom beyond the rear sill member, an arcuate draft member rigidly connected to the protruding end thereof, and means rigidly connecting the opposite end of said arcuate member to the rear sill member at a point substantially in the rear of the point of connection of the front end of said diagonally disposed member.

22. In a tandem draft connection, a binder frame comprising front and rear sill members, a longitudinally extending connecting frame member, a reinforcing frame member rigidly connected to said front sill member at a point adjacent the connection of said longitudinally extending member and protruding diagonally rearward therefrom beyond the rear sill member, an arcuate draft member rigidly connected to the protruding end thereof, and means rigidly connecting the opposite end of said arcuate member to the rear sill member.

23. In a tandem draft connection, a binder frame comprising front and rear sill members, a longitudinally extending connecting frame member, a reinforcing frame member rigidly connected to said front sill member at a point adjacent the connection of said longitudinally extending member and protruding diagonally rearward therefrom beyond the rear sill member, an arcuate draft member rigidly connected to the protruding end thereof, and a support for the opposite end of said arcuate member rigidly connected to said machine frame.

24. In a tandem draft connection, a binder frame comprising front and rear sill members, a longitudinally extending connecting frame member, a reinforcing frame member rigidly connected to said front sill member and protruding diagonally rearward therefrom beyond the rear sill member, an arcuate draft member rigidly connected to the protruding end thereof, and a plurality of braces rigidly connecting the opposite end of said arcuate member to the rear sill member at a point substantially in the rear of the point of connection of the front end of said diagonally disposed member.

25. In a tandem draft connection, a frame, a diagonally disposed supplemental frame member protruded beyond the rear end thereof, a transversely disposed arcuate draft member rigidly connected at its grainward end to said protruding end, a brace rigidly attached to the stubbleward end of said arcuate member for attaching the same to said machine frame, and clamping means rigidly securing said diagonal frame member and brace to said frame.

26. In a tandem draft connection, a frame, a diagonally disposed supplemental frame member attached thereto and protruded beyond the rear end thereof, a transversely disposed arcuate draft member rigidly connected at its grainward end to the protruding end of said member, a rearwardly protruding brace rigidly attached to the stubbleward end of said arcuate member and to said machine frame, and non-penetrating, frame-gripping clamping means rigidly securing said diagonal frame member and brace to said frame.

In testimony whereof I affix my signature, in the presence of two witnesses.

HERBERT B. SPERRY.

Witnesses:
  H. J. McMahon,
  C. W. Embody.